US008071673B2

(12) United States Patent
Persigehl et al.

(10) Patent No.: US 8,071,673 B2
(45) Date of Patent: Dec. 6, 2011

(54) MOULDING COMPOSITIONS BASED ON A THERMOPLASTIC POLYCARBONATE

(75) Inventors: Peter Persigehl, Jiangsu (CN); Jens Peter Joschek, Cologne (DE); Jochen Endtner, Cologne (DE); Detlev Joachimi, Krefeld (DE); Matthias Bienmuller, Krefeld (DE); Kurt Jeschke, Dusseldorf (DE)

(73) Assignee: LANXESS Deutschland GmbH, Leverkusen (DE)

( * ) Notice: Subject to any disclaimer, the term of this patent is extended or adjusted under 35 U.S.C. 154(b) by 570 days.

(21) Appl. No.: 11/887,673

(22) PCT Filed: Mar. 27, 2006

(86) PCT No.: PCT/EP2006/002782
§ 371 (c)(1),
(2), (4) Date: Dec. 3, 2008

(87) PCT Pub. No.: WO2006/105890
PCT Pub. Date: Oct. 12, 2006

(65) Prior Publication Data
US 2009/0209697 A1    Aug. 20, 2009

(30) Foreign Application Priority Data

Apr. 6, 2005    (DE) .......................... 10 2005 015 676
Feb. 10, 2006    (DE) .......................... 10 2006 006 167

(51) Int. Cl.
*C09B 67/00*    (2006.01)
*C08G 73/02*    (2006.01)
*C08G 18/62*    (2006.01)

(52) U.S. Cl. ..... 524/502; 525/185; 525/451; 525/167.5; 525/168; 525/170

(58) Field of Classification Search .................. 524/502; 525/167–174, 176, 185, 451
See application file for complete search history.

(56) References Cited

U.S. PATENT DOCUMENTS

| | | | | |
|---|---|---|---|---|
| 3,419,634 A | 12/1968 | Vaughn | ........................... | 260/824 |
| 3,553,167 A | 1/1971 | Schnell et al. | ..................... | 260/47 |
| 3,644,574 A | 2/1972 | Jackson et al. | ................... | 260/873 |
| 3,654,575 A | 4/1972 | Cluwen | ............................ | 333/30 |
| 4,013,613 A | 3/1977 | Abolins et al. | ................... | 260/40 R |
| 4,075,173 A | 2/1978 | Maruyama et al. | ........... | 260/47 C |
| 4,156,069 A | 5/1979 | Prevorsek et al. | ............. | 528/182 |
| 4,269,964 A | 5/1981 | Freitag et al. | .................. | 528/126 |
| 4,311,823 A | 1/1982 | Imai et al. | ...................... | 528/181 |
| 4,334,053 A | 6/1982 | Freitag et al. | .................. | 528/179 |
| 4,503,183 A | 3/1985 | Liu | ................................ | 524/504 |
| 4,515,921 A | 5/1985 | Witman | ............................ | 525/67 |
| 4,532,282 A * | 7/1985 | Liu et al. | ........................ | 524/157 |
| 4,584,360 A | 4/1986 | Paul et al. | ........................ | 528/14 |
| 4,604,423 A | 8/1986 | Liu | ................................ | 524/508 |
| 4,639,481 A | 1/1987 | Giles, Jr. | ......................... | 524/128 |
| 4,806,593 A | 2/1989 | Kress et al. | ....................... | 525/63 |
| 4,812,515 A | 3/1989 | Kress et al. | ....................... | 525/69 |
| 4,859,740 A | 8/1989 | Damrath et al. | ................ | 525/100 |
| 4,861,831 A | 8/1989 | Damrath et al. | ................ | 525/100 |
| 4,937,285 A | 6/1990 | Wittmann et al. | .............. | 525/67 |
| 4,982,014 A | 1/1991 | Freitag et al. | .................. | 568/721 |
| 5,204,394 A | 4/1993 | Gosens et al. | .................. | 524/125 |
| 5,672,645 A | 9/1997 | Eckel et al. | ...................... | 524/127 |
| 6,020,414 A | 2/2000 | Nelsen et al. | ................... | 524/424 |
| 6,048,931 A | 4/2000 | Fujita et al. | | |
| 6,093,759 A | 7/2000 | Gareiss et al. | .................. | 524/122 |
| 6,759,480 B1 | 7/2004 | Bouilloux et al. | .............. | 525/60 |
| 7,022,768 B1 | 4/2006 | Lacroix et al. | .................. | 525/166 |
| 7,378,470 B2 * | 5/2008 | Persigehl et al. | .............. | 525/167 |
| 2004/0054171 A1 | 3/2004 | Jensen et al. | | |

FOREIGN PATENT DOCUMENTS

| | | |
|---|---|---|
| DE | 22 32 877 | 4/1980 |
| DE | 30 07 934 | 9/1981 |
| EP | 0 300 051 | 1/1989 |
| EP | 0 320 647 | 6/1989 |
| EP | 682 057 | 11/1995 |
| EP | 728 811 | 9/2003 |
| FR | 2 819 821 | 7/2002 |
| JP | 1-247454 | 10/1989 |
| JP | 06-200139 | 7/1994 |
| WO | 98/27159 | 6/1998 |
| WO | WO 9827159 A1 * | 6/1998 |

OTHER PUBLICATIONS

Translation of Chinese Office Action in co-pending application.
Translation of Japanese Office Action in co-pending application.
Kleven von Kunststoffe 2000, 90 (9), pp. 116-118, Carl Hanser Verlag, Munchen.
Kunststoffe 2001, 91 (10) pp. 179-190, Carl Hanser Verlag, Munchen; Nanocomposites—auf Dem Weg zur Anwendung.
Hult, Anders et al, Advance in Polymer Science 1999, 143 (Branched Polymers II), pp. 1-34 "Hyperbranched Polymers".
Schnell, "Chemistry and Physics of Polycarbonates", Interscience Publishers, 1964.
Ullmann's Encyclopadie der technischen CHemie [Ullmann's Encyclopedia of Industrial Chemistry] vol. 18, pp. 301 et seq (1979) "Phosphoroxide, Phospyorsauren and Phosphate".
Houben-Weyl , Methoden der organischen Chemie [Methods of Organic chemistry], vol. 12/1, p. 43.
Beilstein Handbuch der org. Chemie vol. 6, p. 177-182.
W. Scholitan, H. Lange, Kolloid, Z. und Z. Polymere 250 (1972), 782-796 Bestimmung der Teilchengrößenverteilung von Latices mit der Ultrazentrifuge).

(Continued)

*Primary Examiner* — Michael M Bernshteyn
(74) *Attorney, Agent, or Firm* — Nicanor A. Kohncke

(57) ABSTRACT

This invention relates to thermoplastic moulding compositions with improved flowability based on a thermoplastic polycarbonate and on a copolymer of at least one olefin with at least one methacrylic ester or acrylic ester of an aliphatic alcohol, where the MFI of the copolymer is no less than 100 g/10 min, to a process for preparation of these moulding compositions, and also to the use of these moulding compositions for production of mouldings for the electrical industry, electronics industry, telecommunications industry, motor vehicle industry, or computer industry, in sports, in medicine, in households, or in the entertainment industry.

4 Claims, No Drawings

OTHER PUBLICATIONS

Ullmann's Encyclopadie der Technischen Chemie [Ullmann's Encyclopedia of Industrial Chemistry] vol. 19 (1980), p. 280 et seq. "Polystyrol einschlieBlich ABS und SAN".

Gächter, Muller, Kunststoffe-Additive [Plastics Additives], 3rd Ed. Hanser-Verlag, Munich, Vienna, 1989 "Taschenbuch der Kunststoff-Additive".

Plastics Additive Handbook, 5th edition, Hanser-Verlag, Munich 2001."Adding Value to Polymers".

Chinese Office Action from co-pending Application 200680011100.8 dated Jan. 22, 2010, 17 pages, and translation thereof.

* cited by examiner

MOULDING COMPOSITIONS BASED ON A THERMOPLASTIC POLYCARBONATE

This invention relates to moulding compositions based on a thermoplastic polycarbonate and on at least one copolymer of at least one olefin, preferably an α-olefin, with at least one methacrylic ester or acrylic ester of an aliphatic alcohol, where the MFI (Melt Flow Index) of the copolymer is no less than 100 g/10 min, to a process for preparation of these moulding compositions, and also to the use of these moulding compositions for production of mouldings for the electrical industry, electronics industry, telecommunications industry, motor vehicle industry, or computer industry, in sports, in households, in medicine, or for the entertainment industry.

Highly flowable thermoplastic compositions are of interest for a wide variety of injection-moulding applications. By way of example, thin-walled components in the electrical industry, electronics industry and motor vehicle industry demand low viscosities of the thermoplastics composition in order to permit charging of the material to the mould with minimum fill pressures or clamping forces in the corresponding injection-moulding machines. This is also relevant to the simultaneous charging of material to a plurality of injection-moulding components by way of a shared runner system in what are known as multicavity tooling systems. Shorter cycle times can moreover often be achieved using low-viscosity thermoplastic compositions.

However, although the thermoplastic compositions have high flowability, the actual components produced therefrom are subjected to stringent mechanical requirements, and the lowering of viscosity cannot therefore be permitted to impair mechanical properties significantly. Because of the design of the components to be produced, the requirements placed upon mechanical properties, e.g. impact resistance or an outer fibre strain are increasingly frequently higher than for standard thermoplastics.

There are a number of ways of obtaining highly flowable, low-viscosity thermoplastic moulding compositions.

One way uses low-viscosity polymer resins with low molecular weight as main polymers for the thermoplastic moulding compositions. However, the use of low-molecular-weight polymer resins is often attended by impairment of mechanical properties, in particular of toughness. Furthermore, preparation of a low-viscosity polymer resin in an existing polymerization plant often demands complicated reengineering attended by capital expenditure.

Another way uses what are known as flow auxiliaries, also termed flow agents or flow aids or internal lubricants, which are an additive that can be added to the polymer resin.

These flow auxiliaries are known from the literature, e.g. in Kunststoffe 2000, 90 (9), pp. 116-118, and by way of example they can be fatty acid esters of polyols, or can be amides composed of fatty acids and of amines. However, these fatty acid esters, e.g. pentaerythritol tetrastearate or ethylene glycol dimontanoate, have only limited miscibility with polar thermoplastics, such as polyamides, polyalkylene terephthalates or polycarbonates. Their concentration increases at the surface of the moulding, and they are therefore also used as mould-release agents. Furthermore, particularly if concentrations are relatively high, they can migrate to the surface of these mouldings under warm storage conditions and increase their concentration there. This can by way of example lead to problems in relation to paint adhesion or metal adhesion in coated mouldings.

As an alternative to the surface-active flow auxiliaries, internal flow auxiliaries compatible with the polymer resins can be used. Examples of those suitable for this purpose are low-molecular-weight compounds or branched, highly branched or dendritic polymers whose polarity is similar to that of the polymer resin. These highly branched or dendritic systems are known from the literature and their bases can by way of example be branched polyesters, polyamides, polyesteramides, polyethers or polyamines, as described in Kunststoffe 2001, 91 (10), pp. 179-190, or in Advances in Polymer Science 1999, 143 (Branched Polymers II), pp. 1-34.

EP 0 682 057 A1 describes the use of the nitrogen-containing first-generation 4-cascade dendrimer: 1,4-diaominobutane[4]propylamine (N,N'-tetrabis(3-aminopropyl)-1,4.-butanediamine) DAB(PA)$_4$ to lower viscosity in nylon-6, nylon-6,6 and polybutylene terephthalate (PBT). While use of DAB (PA)$_4$ to lower viscosity in polyamides has practically no effect on the impact resistance of the resultant moulding compositions (difference <5%), impact resistance falls by more than 15% in the case of PBT.

WO-A 98 27159 describes the improvement in toughness of glass-fibre-reinforced polyesters or polycarbonates via use of two copolymers composed of ethene and acrylates, where one copolymer also bears a reactive epoxy or oxirane function. The improvement in flow of the moulding compositions is an aim of the invention, but the comparative system described composed of polyester and of the copolymer of ethene and methacrylate has higher melt viscosity than the straight polyester system.

JP 01247454 describes mixtures having low-temperature impact strength composed of polyesters with a copolymer of ethene and an unreactive alkyl acrylate with MFI of 5.8 g/10 min (at 190° C., 2.16 kg) and a copolymer of ethene and an acrylate having an additional reactive group. Improvement of the flow of moulding compositions is not the subject of the said patent.

EP-A 1 191 067 (=U.S. Pat. No. 6,759,480) describes the impact-modification of thermoplastics, inter alia of polyamide and polybutylene terephthalate, via a mixture composed of a copolymer of ethene with an unreactive alkyl acrylate and also a copolymer of ethene with an acrylate having an additional reactive group. The flowability of the moulding compositions is not discussed.

EP-A 0 838 501 (=U.S. Pat. No. 6,020,414) describes mixtures having low-temperature impact resistance of reinforcing materials and polyesters with a copolymer of ethene and an unreactive alkyl acrylate and also a copolymer of ethene and an acrylate having an additional reactive group. The best embodiment of the application here is achieved with a copolymer of ethene and methyl acrylate. Improvement of the flow of moulding compositions is not the subject of the said application.

WO-A 2 001 038 437 (AU 4 610 801 A) describes mixtures composed of polyester with a core-shell rubber and two different copolymers of ethene and acrylates having, and not having, additional reactive groups. The toughness of the moulding compositions can be improved, but according to Table 4 and Table 9 the flowability even of the binary mixtures composed of polyester and one of the further constituents mentioned is no better for the mixtures used than for the straight polyesters. The MFI value (MFI=Melt Flow Index) of the copolymer used of ethene and 2-ethylhexyl acrylate is 2 g/10 min (at 190° C., 2.16 kg).

FR-A 28 19 821 describes the use of copolymers of ethene with 2-ethylhexyl acrylate whose MFI is smaller than 100 as constituent of hot-melt adhesive mixtures. There are no indications of applications for elastomer modification or flowability improvement of semicrystalline thermoplastics.

The object of the present invention then consisted in lowering the viscosity of polycondensate compositions based on thermoplastic polycarbonates by providing additives to the polymer melt, without any need here to accept impairment of properties such as notched impact strength, as is the case when using lower-viscosity polymer resins or additives known from the literature. In terms of stiffness, strength and tensile strain, the compositions based on thermoplastic polycarbonates should as far as possible not differ significantly from the polycondensate compositions based on thermoplastic polycarbonates not provided with additives, thus permitting use of the materials for problem-free replacement of those for plastics structures based on thermoplastic polycarbonates.

The object is achieved via thermoplastic moulding compositions, which are therefore provided by the present invention, comprising A) from 99.9 to 10 parts by weight, preferably from 99.0 to 40 parts by weight, particularly preferably from 80.0 to 50.0 parts by weight, of at least one thermoplastic polycarbonate, preferably of an aromatic polycarbonate and/or of a polyester carbonate
B) from 0.1 to 20 parts by weight, preferably from 0.25 to 15 parts by weight, particularly preferably from 1.0 to 10 parts by weight, of at least one copolymer of at least one olefin, preferably an α-olefin, and at least one methacrylic ester or acrylic ester of an aliphatic alcohol, preferably an aliphatic alcohol having from 5-30 carbon atoms, where the MFI (Melt Flow Index) of the copolymer B) is no less than 100 g/10 min, preferably no less than 150 g/10 min.

For the purposes of the present invention, MFI (Melt Flow Index) was measured or determined uniformly at 190° C. with a test weight of 2.16 kg.

Surprisingly, it has been found that mixtures of thermoplastic polycarbonates and of a copolymer of α-olefins with methacrylic esters or acrylic esters of aliphatic alcohols whose MFI is no less than 100 g/10 min give the desired lowering of melt viscosity of the resultant inventive moulding compositions, and indeed the inventive moulding compositions and the mouldings produced here from these have markedly improved notched impact strength when compared with moulding compositions without copolymer. The moulding compositions have excellent suitability for use in thin-wall technology.

According to the invention, the thermoplastic moulding compositions comprise, as component A), at least one thermoplastic polycarbonate, preferably aromatic polycarbonate, and/or one polyester carbonate.

According to the invention, aromatic polycarbonates and/or aromatic polyester carbonates suitable as component A) are known from the literature or can be prepared by processes known from the literature (for preparation of aromatic polycarbonates see by way of example Schnell, "Chemistry and Physics of Polycarbonates", Interscience Publishers, 1964, and German Auslegeschrift 1 495 626 (=U.S. Pat. No. 3,553,167), DE-A 2,232,877, DE-A 2,703,376 (=U.S. Pat. No. 4,075,173), DE-A 2 714 544 (=U.S. Pat. No. 4,156,069), DE-A 3 000 610 (=U.S. Pat. No. 4,311,823), DE-A 3 832 396 (=U.S. Pat. No. 4,982,014); for preparation of aromatic polyester carbonates, see, for example, DE-A 3 007 934 (=CA 1 174 998 A1).

Aromatic polycarbonates are prepared by way of example via melt processes or via reaction of diphenols with halides of carbonic acid, preferably phosgene, and/or with dihalides of aromatic dicarboxylic acids, preferably halides of benzenedicarboxylic acid, by the interfacial process, if appropriate with use of chain terminators, e.g. monophenols, and if appropriate with the use of trifunctional or more-than-trifunctional branching agents, such as triphenols or tetraphenols.

Diphenols for preparation of the aromatic polycarbonates and/or aromatic polyester carbonates are preferably those of the formula (I)

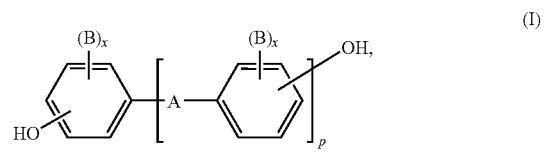
(I)

where
A is a single bond, $C_1$ to $C_5$-alkylene, $C_2$ to $C_5$-alkylidene, $C_5$ to $C_6$-cycloalkylidene, —O—, —SO—, —CO—, —S—, —$SO_2$—, $C_6$ to $C_{12}$-arylene, condensed onto which there can, if appropriate, be further aromatic rings which may if appropriate contain heteroatoms,
or is a radical of the formula (II) or (III)

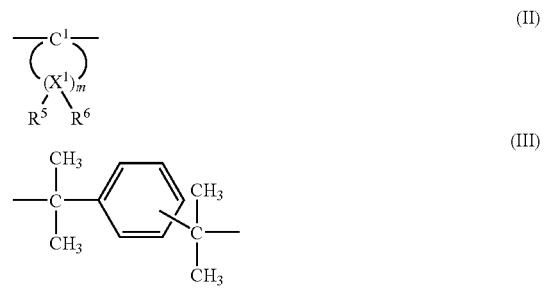

B is in each case $C_1$ to $C_{12}$-alkyl or halogen, preferably methyl, chlorine and/or bromine,
x is in each case, independently of the others, 0, 1 or 2,
p is 1 or 0, and
$R^5$ and $R^6$ can be selected individually for each $X^1$, and, independently of the others, are hydrogen or $C_1$ to $C_6$-alkyl, preferably hydrogen, methyl or ethyl,
$X^1$ is carbon and
m is a whole number from 4 to 7, preferably 4 or 5, with the proviso that at at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulphoxides, bis(hydroxyphenyl) ketones, bis(hydroxyphenyl) sulphones and α,α(bis(hydroxyphenyl)diisopropylbenzenes and also their ring-brominated and/or ring-chlorinated derivatives.

Particularly preferred diphenols are 4,4'-dihydroxybiphenyl, bisphenol A, 2,4-bis(4-hydroxyphenyl)-2-methylbutane, 1,1-bis(4-hydroxyphenyl) cyclohexane, 1,1-bis(4-hydroxyphenyl)-3,3,5-trimethylcyclohexane, 4,4'-dihydroxydiphenyl sulphide, 4,4'-dihydroxydiphenyl sulphone and also their di- and tetrabrominated or chlorinated derivatives, e.g. 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Particular preference is given to 2,2-bis(4-hydroxyphenyl)propane (bisphenol A).

The diphenols can be used individually or in the form of any desired mixture. The diphenols are known from the literature or can be obtained by processes known from the literature.

Examples of chain terminators suitable for preparation of the thermoplastic, aromatic polycarbonates are phenol, p-chlorophenol, p-tert-butylphenol or 2,4,6-tribromophenol, and also long-chain alkylphenols, e.g. 4-(1,3-tetramethylbutyl)phenol according to DE-A 2 842 005 (=U.S. Pat. No. 4,269,964) or monoalkylphenol and, respectively, dialkylphenols having a total of from 8 to 20 carbon atoms in the alkyl substituents, e.g. 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally from 0.5 mol % to 10 mol %, based on the molar entirety of the particular diphenols used.

The thermoplastic, aromatic polycarbonates to be used as component A) can have branching in a known manner, and specifically and preferably via incorporation of from 0.05 to 2.0 mol %, based on the entirety of the diphenols used, of trifunctional or more-than-trifunctional compounds, e.g. those having three or more phenolic groups.

Homopolycarbonates and copolycarbonates are both suitable. Preparation of the copolycarbonates to be used as component A) can also use from 1 to 25% by weight, preferably from 2.5 to 25% by weight, of polydiorganosiloxanes having hydroxyaryloxy end groups (based on the total amount of diphenols to be used). These are known (an example being U.S. Pat. No. 3,419,634) or can be prepared by processes known from the literature. Preparation of copolycarbonates containing polydiorganosiloxane is described by way of example in DE-A 3 334 782 (=U.S. Pat. No. 4,584,360).

Polycarbonates to be used with preference as component A) are not only bisphenol A-homopolycarbonates but also the copolycarbonates of bisphenol A having up to 15 mol %, based on the molar entirety of diphenols, of other diphenols mentioned as preferred or particularly preferred.

Aromatic dicarbonyl dihalides for preparation of aromatic polyester carbonates are preferably the dichlorides of the following diacids: isophthalic acid, terephthalic acid, diphenyl ether 4,4'-dicarboxylic acid and naphthalene-2,6-dicarboxylic acid.

Particular preference is given to mixtures of the dichlorides of the diacids isophthalic acid and terephthalic acid in a ratio of from 1:20 to 20:1.

A halide of carbonic acid is also used in the preparation of polyester carbonates, preference being given to use of phosgene as a bifunctional acid derivative.

Other chain terminators that can be used for preparation of the aromatic polyester carbonates to be used as component A), besides the abovementioned monophenols, are their chloroformates and also the chlorides of aromatic monocarboxylic acids which may if appropriate have substitution by $C_1$ to $C_{22}$-alkyl groups or by halogen atoms, and also chlorides of aliphatic $C_2$ to $C_{22}$-monocarboxylic acids.

The amount of chain terminators is in each case from 0.1 to 10 mol %, based on moles of diphenols in the case of the phenolic chain terminators and on mole of dichlorides of dicarboxylic acid in the case of chain terminators that are a chloride of a monocarboxylic acid.

There may also be aromatic hydroxycarboxylic acids incorporated into the aromatic polyester carbonates.

The aromatic polyester carbonates can either be linear or have branching in a known manner (in which connection see also DE-A 2 940 024 (=U.S. Pat. No. 4,334,053) und DE-A 3 007 934 (=CA 1 117 998 A1)).

Examples of branching agents that can be used are chlorides of carboxylic acids whose basicity is three or higher, e.g. trimesyl trichloride, cyanuryl trichloride, 3,3'- or 4,4'-benzophenonetetracarbonyl tetrachloride, 1,4,5,8-napthalenetetracarbonyl tetrachloride, or pyromellityl tetrachloride, in amounts of from 0.01 to 1.0 mol % (based on dichlorides used of dicarboxylic acids), or phenols of functionality three or higher, e.g. fluoroglucinol, 4,6-dimethyl-2,4,6-tri(4-hydroxyphenyl)heptene, 2,4,4-dimethyl-2,4-6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of from 0.01 to 1.0 mol %, based on diphenols used. Phenolic branching agents can be used as initial charge with the diphenols, and acid chloride branching agents can be introduced together with the acid dichlorides.

In the thermoplastic, aromatic polyester carbonates to be used as component A), the proportion of carbonate structure units can vary as desired. The proportion of carbonate groups is preferably up to 100 mol %, in particular up to 80 mol %, particularly preferably up to 50 mol %, based on the entirety of ester groups and carbonate groups. Both the ester and the carbonate fraction of the aromatic polyester carbonates can be present in the form of blocks or can have random distribution in the polycondensate.

The relative solution viscosity ($\eta_{rel}$) of the aromatic polycarbonates and polyester carbonates is in the range from 1.18 to 1.4, preferably from 1.20 to 1.32 (measured on solutions of 0.5 g of polycarbonate or polyester carbonate in 100 ml of methylene chloride solution at 25° C.).

The thermoplastic, aromatic polycarbonates and polyester carbonates to be used as component a) can be used alone or in any desired mixture.

The inventive compositions comprise, as component B), copolymers, preferably random copolymers, of at least one olefin, preferably α-olefin, and at least one methacrylic ester or acrylic ester of an aliphatic alcohol, where the MFI of the copolymer B) is no less than 100 g/10 min, preferably no less than 150 g/10 min. In one preferred embodiment, the copolymer B) is composed of less than 4% by weight, particularly preferably less than 1.5% by weight, and very particularly preferably 0% by weight, of monomer units which contain further reactive functional groups (selected from the group consisting of epoxides, oxetanes, anhydrides, imides, aziridines, furans, acids, amines, oxazolines).

Olefins, preferably α-olefins, suitable as a constituent of the copolymer B) preferably have from 2 to 10 carbon atoms and can be unsubstituted or have substitution by one or more aliphatic, cycloaliphatic or aromatic groups.

Preferred olefins have been selected from the group consisting of ethene, propene, 1-butene, 1-pentene, 1-hexene, 1-octene, 3-methyl-1-pentene. Particularly preferred olefins are ethene or propene, and ethene is very particularly preferred.

Mixtures of the olefins described are likewise suitable.

In a further preferred embodiment, the further reactive functional groups (selected from the group consisting of epoxides, oxetanes, anhydrides, imides, aziridines, furans, acids, amines, oxazolines) of the copolymer B) are introduced exclusively by way of the olefins into the copolymer B).

The content of the olefin in the copolymer B) is from 50 to 90% by weight, preferably from 55 to 75% by weight.

The copolymer B) is further defined via the second constituent along the side of the olefin. Alkyl esters or arylalkyl esters of acrylic acid or methacrylic acid are a suitable second constituent. In one embodiment of the present invention, alkyl esters of acrylic acid or methacrylic acid are used, the alkyl or arylalkyl group thereof being formed from 5-30 carbon atoms. However, the invention also includes $C_1$-$C_4$-alkyl esters as cited in the examples. The alkyl or arylalkyl group here can be linear or branched, and can also contain cycloaliphatic or aromatic groups, and alongside this can also have substitution by one or more ether functions or one or more thioether functions. Other suitable methacrylic or acrylic esters in this connection are those synthesized from an alcohol component based on oligoethylene glycol or on oligopropylene glycol, having only one hydroxy group and no more than 30 carbon atoms.

By way of example, the alkyl or arylalkyl group of the methacrylic or acrylic ester can have been selected from the group consisting of 1-pentyl, 1-hexyl, 2-hexyl, 3-hexyl, 1-heptyl, 3-heptyl, 1-octyl, 1-(2-ethyl)hexyl, 1-nonyl, 1-decyl, 1-dodecyl, 1-lauryl, or 1-octadecyl. Preference is given to alkyl or arylalkyl groups having from 6 to 20 carbon atoms. Particular preference is also given to branched alkyl groups which in comparison with linear alkyl groups of the same number of carbon atoms lead to a lower glass transition temperature $T_G$.

Particular preference is given according to the invention to copolymers B) in which the olefin is copolymerized with 2-ethylhexyl acrylate. Mixtures of the acrylic or methacrylic esters described are likewise suitable.

Preference is given here to the use of more than 60% by weight, particularly preferably more than 90% by weight, and very particularly preferably the use of 100% by weight, of 2-ethylhexyl acrylate, based on the total amount of acrylic and methacrylic ester in the copolymer B).

In another preferred embodiment, the further reactive functional groups (selected from the group consisting of epoxides, oxetanes, anhydrides, imides, aziridines, furans, acids, amines, oxazolines) of the copolymer B) are introduced exclusively by way of the acrylic or methacrylic ester into the copolymer B).

The content of the acrylic or methacrylic esters in the copolymer B) is from 10 to 50% by weight, preferably from 25 to 45% by weight.

A feature of suitable copolymers B), alongside the constitution, is the low molecular weight. Accordingly, copolymers B) suitable for the inventive moulding compositions are only those whose MFI value measured at 190° C. with a load of 2.16 kg is at least 100 g/10 min, preferably at least 150 g/10 min, particularly preferably at least 300 g/10 min.

Suitable copolymers of component B) can by way of example have been selected from the group of the materials supplied by Atofina (Arkema since October 2004) with trademarks Lotryl® EH or Lotryl®BA, these usually being used as hot-melt adhesives.

In one preferred embodiment, the inventive thermoplastic moulding compositions can comprise, in addition to components A) and B), one or more of the components from the series C), D), E), F) or G).

In this type of preferred embodiment, therefore, the following can be present in addition to components A) and B):
C) from 0.001 to 70 parts by weight, preferably from 5 to 50 parts by weight, particularly preferably from 9 to 47 parts by weight, of a filler and/or reinforcing material in the thermoplastic moulding compositions.

However, the material can also comprise a mixture composed of two or more different fillers and/or reinforcing materials, for example based on talc, mica, silicate, quartz, titanium dioxide, wollastonite, kaolin, amorphous silicas, magnesium carbonate, chalk, feldspar, barium sulphate, glass beads and/or fibrous fillers and/or reinforcing materials based on carbon fibres and/or glass fibres. It is preferable to use mineral particulate fillers based on talc, mica, silicate, quartz, titanium dioxide, wollastonite, kaolin, amorphous silicas, magnesium carbonate, chalk, feldspar, barium sulphate and/or glass fibres. According to the invention, it is particularly preferable to use mineral particulate fillers based on talc, wollastonite, kaolin and/or glass fibres.

Particularly for applications in which isotropy of dimensional stability and high thermal dimensional stability are demanded, examples being motor vehicle applications for exterior bodywork parts, it is preferable to use mineral fillers, in particular talc, wollastonite or kaolin.

It is also particularly preferable to use acicular mineral fillers as component C). According to the invention, acicular mineral fillers is the term for a mineral filler with pronounced acicular character. Acicular wollastonites may be mentioned as an example. The length:diameter ratio of the mineral is preferably from 2:1 to 35:1, particularly preferably from 3:1 to 19:1, most preferably from 4:1 to 12:1. The average particle size of the inventive acicular minerals is preferably smaller than 20 µm, particularly preferably smaller than 15 µm, with particular preference smaller than 10 µm, determined using a CILAS GRANULOMETER.

As previously described above, the filler and/or reinforcing material can, if appropriate, have surface modification, for example with a coupling agent or coupling agent system, based on silane for example. However, pre-treatment is not essential. Particularly when glass fibres are used, polymer dispersions, film-formers, branching agents and/or glass fibre processing aids can also be used in addition to silanes.

The glass fibres whose use is particularly preferred according to the invention, their fibre diameter being generally from 7 to 18 µm, preferably from 9 to 15 µm, are added in the form of continuous-filament fibres or in the form of chopped or ground glass fibres. The fibres can have been equipped with a suitable size system and with a coupling agent or coupling agent system, e.g. based on silane.

Commonly used coupling agents based on silane for pre-treatment are silane compounds such as those of the general formula (IV)

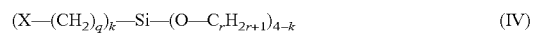

(IV)

in which the substituents are defined as follows:
X:

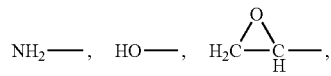

q: is a whole number from 2 to 10, preferably from 3 to 4,
r: is a whole number from 1 to 5, preferably from 1 to 2,
k: is a whole number from 1 to 3, preferably 1.

Preferred coupling agents are silane compounds from the group of aminopropyltrimethoxysilane, aminobutyltrimethoxysilane, aminopropyltriethoxysilane, aminobutyltriethoxysilane and the corresponding silanes which contain a glycidyl group as substituent X.

The amounts of the silane compounds used for surface coating to treat the fillers are generally from 0.05 to 2% by weight, preferably from 0.25 to 1.5% by weight and in particular from 0.5 to 1% by weight, based on the mineral filler.

Processing to give the moulding composition or to give the moulding can have the effect that the d97 value or d50 value of the particulate fillers in the moulding composition or in the moulding is smaller than that of the fillers originally used. Processing to give the moulding composition or to give the moulding can have the effect that the length distributions of the glass fibres in the moulding composition or in the moulding are shorter than those originally used.

In an alternative preferred embodiment, the thermoplastic moulding compositions can comprise, in addition to components A) and B) and/or C)

D) from 0.001 to 30 parts by weight, preferably from 3 to 22 parts by weight, particularly preferably from 7 to 16 parts by weight, of at least one flame retardant.

Phosphorus-containing flame retardants for the purposes of the invention are preferably those selected from the groups of the mono- and oligomeric phosphoric and phosphonic esters, phosphonate amines and phosphazenes, and it is also possible here to use, as flame retardant, a mixture of a plurality of components selected from one or from a variety of these groups. It is also possible to use other halogen-free phosphorus compounds not specifically mentioned here, alone or in any desired combination with other halogen-free phosphorus compounds.

Preferred mono- and oligomeric phosphoric or phosphonic esters are phosphorus compounds of the general formula (V)

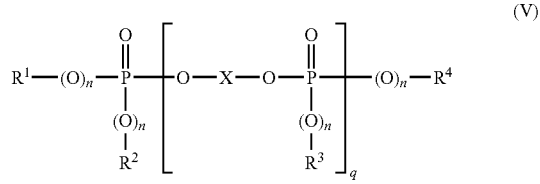

(V)

in which each of $R^1$, $R^2$, $R^3$ and $R^4$, independently of the others, is optionally halogenated $C_1$-$C_8$-alkyl, optionally alkyl-substituted, preferably $C_1$-$C_4$-alkyl-substituted, and/or halogen-substituted, preferably chlorine-, bromine-substituted, $C_5$-$C_6$-cycloalkyl, $C_6$-$C_{20}$-aryl or $C_7$-$C_{12}$-aralkyl, n are, independently of each other, 0 or 1 q is from 0 to 30 and

X is a mono- or polynuclear aromatic radical having from 6 to 30 carbon atoms, or a linear or branched aliphatic radical having from 2 to 30 carbon atoms, which can have OH substitution and can contain up to 8 ether bonds.

$R^1$, $R^2$, $R^3$ and $R^4$ are preferably, independently of each other, $C_1$-$C_4$-alkyl, phenyl, naphthyl or phenyl-$C_1$-$C_4$-alkyl. The aromatic groups $R^1$, $R^2$, $R^3$ and $R^4$ can in turn have substitution by halogen groups and/or by alkyl groups, preferably chlorine, bromine and/or $C_1$-$C_4$-alkyl. Particularly preferred aryl radicals are cresyl, phenyl, xylenyl, propylphenyl or butylphenyl and the corresponding bromated and chlorinated derivatives thereof.

X in the formula (V) is preferably a mono- or polynuclear aromatic radical having from 6 to 30 carbon atoms. This is preferably derived from diphenols of the formula (I).

n in the formula (V) can, independently of each other, be 0 or 1, and n is preferably equal to 1.

q has values of from 0 to 30. If a mixture of various components of the formula (V) is used, mixtures used can preferably have number-average q values of from 0.3 to 20, particularly preferably from 0.5 to 10, in particular from 0.5 to 6.

X is particularly preferably

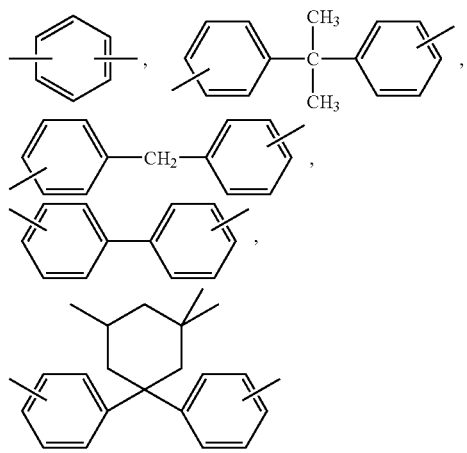

or their chlorinated or bromated derivative, and in particular X is derived from resorcinol, hydroquinone, bisphenol A or diphenylphenol. X is particularly preferably derived from bisphenol A.

The use of oligomeric phosphoric esters of the formula (V) which are derived from bisphenol A is particularly advantageous since the compositions treated with this phosphorus compound have particularly high resistance to stress cracking and to hydrolysis and also particularly little tendency towards formation of deposit during injection moulding. Furthermore, these flame retardants can achieve particularly high heat resistance.

Monophosphates (q=0), oligophosphates (q=1-30) or a mixture composed of mono- and oligophosphates can be used as component D) to be used optionally according to the invention.

Particular monophosphorus compounds of the formula (V) are tributyl phosphate, tris(2-chloro-ethyl) phosphate, tris(2,3-dibromopropyl) phosphate, triphenyl phosphate, tricresyl phosphate, diphenyl cresyl phosphate, diphenyl octyl phosphate, diphenyl 2-ethylcresyl phosphate, tri(isopropylphenyl) phosphate, halogen-substituted aryl phosphates, dimethyl methylphosphonate, diphenyl methylphosphonate, diethyl phenylphosphonate, triphenylphosphine oxide or tricresylphosphine oxide.

The phosphorus compounds of the formula (V) to be used optionally as component D) are known (cf., for example, EP-A 363 608 (=U.S. Pat. No. 5,204,394), EP-A 640 655 (=U.S. Pat. No. 5,672,645)) or can be prepared in an analogous manner according to known methods (e.g. Ullmanns Encyklopädie der technischen Chemie [Ullmann's Encyclopaedia of Industrial Chemistry], Vol. 18, pp. 301 et seq. 1979; Houben-Weyl, Methoden der organischen Chemie [Methods of Organic Chemistry], Vol. 12/1, p. 43; Beilstein Vol. 6, p. 177).

The average q values can be determined by using suitable methods (gas chromatography (GC), High Pressure Liquid Chromatography (HPLC), gel permeation chromatography (GPC)) to determine the constitution of the phosphate mixture (molecular weight distribution) and using this to calculate the average values for q.

Phosphonate amines also for optional use as component D) are preferably compounds of the formula (VI)

$$A_{3-y}\text{-NB}^1_y \qquad \text{(VI)}$$

in which

A is a radical of the formula (VIa)

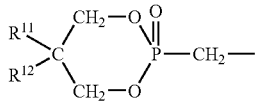

or (VIb)

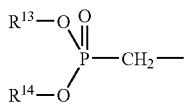

in which $R^{11}$ and $R^{12}$, independently of each other, are unsubstituted or substituted $C_1$-$C_{10}$-alkyl or unsubstituted or substituted $C_6$-$C_{10}$-aryl, $R^{13}$ and $R^{14}$, independently of each other, are unsubstituted or substituted $C_1$-$C_{10}$-alkyl or unsubstituted or substituted $C_6$-$C_{10}$-aryl, or $R^{13}$ and $R^{14}$ together are unsubstituted or substituted $C_3$-$C_{10}$-alkylene, y has the numerical values 0, 1 or 2 and $B^1$ is independently hydrogen, optionally halogenated $C_2$-$C_8$-alkyl, unsubstituted or substituted $C_6$-$C_{10}$-aryl.

$B^1$ is preferably independently hydrogen, ethyl, n- or isopropyl, where these can have halogen substitution, unsubstituted or $C_1$-$C_4$-alkyl- and/or halogen-substituted $C_6$-$C_{10}$-aryl, in particular phenyl or naphthyl.

Alkyl in $R^{11}$, $R^{12}$, $R^{13}$ and $R^{14}$ is independently preferably methyl, ethyl, n-propyl, isopropyl, n-, iso-, sec- or tert-butyl, pentyl or hexyl.

Substituted alkyl in $R^{11}$, $R^{12}$, $R^{13}$ and $R^{14}$ is independently preferably halogen-substituted $C_1$-$C_{10}$-alkyl, in particular mono- or disubstituted methyl, ethyl, n-propyl, isopropyl, n-, iso-, sec- or tert-butyl, pentyl or hexyl.

$C_6$-$C_{10}$-Aryl in $R^{11}$, $R^{12}$, $R^{13}$ and $R^{14}$ is independently preferably phenyl, naphthyl or binaphthyl, in particular o-phenyl, o-naphthyl, o-binaphthyl, where these can have substitution (generally mono-, di- or tri-) by halogen.

$R^{13}$ and $R^{14}$ can, together with the oxygen atom to which they have direct bonding and the phosphorus atom, form a ring structure.

Preferable mention is given to the following compound by way of example: 5,5,5',5',5",5"-hexa-methyltris(1,3,2-dioxaphosphorinanemethane)amino 2,2',2"-trioxide of the formula (VIa-1)

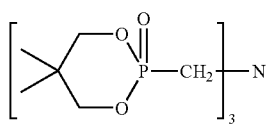

(Trial product XPM 1000 from Solutia Inc., St. Louis, USA)

1,3,2-Dioxaphosphorinane-2-methanamine, N-butyl-N[(5,5-dimethyl-1,3,2-dioxaphosphorinan-2-yl)methyl]-5,5-dimethyl-,P,2-dioxides; 1,3,2-dioxaphosphorinane-2-methanamine, N-[[5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di(4-chlorobutyl)-5,5-dimethyl-2-oxides; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P2-dioxide.

Preference is further given to:

compounds of the formula (VIa-2) or (VIa-3)

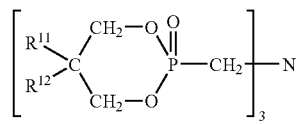

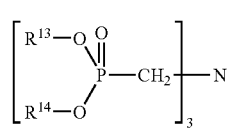

where $R^{11}$, $R^{12}$, $R^{13}$ and $R^{14}$ are defined as above.

Compounds of the formulae (VIa-2) and (VIa-1) are particularly preferred.

Preparation of the phosphonate amines is described by way of example in U.S. Pat. No. 5,844,028.

Phosphazenes to be used optionally according to the invention as component D) are compounds of the formulae (VIIa) and (VIIb)

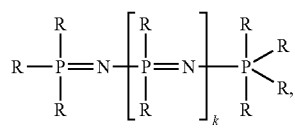

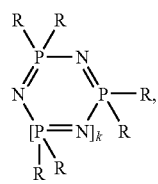

in which each R is identical or different and is amino, optionally halogenated, preferably fluorinated, $C_1$-$C_8$-alkyl, or $C_1$-$C_8$-alkoxy, optionally alkyl-substituted, preferably $C_1$-$C_4$-alkyl-substituted and/or halogen-substituted, preferably chlorine- and/or bromine-substituted, $C_5$-$C_6$-cycloalkyl, $C_6$-$C_{20}$-aryl, preferably phenyl or naphthyl, $C_6$-$C_{20}$-aryloxy, preferably phenoxy, naphthyloxy, or $C_7$-$C_{12}$-aralkyl, preferably phenyl-$C_1$-$C_4$-alkyl, k is 0 or a number from 1 to 15, preferably a number from 1 to 10.

Examples that may be mentioned are:

Propoxyphosphazene, phenoxyphosphazene, methylphenoxyphosphazene, aminophosphazene and fluoroalkylphosphazenes.

Phenoxyphosphazene is preferred.

The phosphazenes can be used alone or in the form of a mixture. The radical R can be always identical, or 2 or more radicals in the formulae (VIIa) and (VIIb) can be different.

Phosphazenes and their preparation are described by way of example in EP-A 728 811, DE-A 1 961668 (=U.S. Pat. No. 3,654,575) and WO 97/40092.

The flame retardants to be used optionally as component D) can be used alone or in any desired mixture with one another or in a mixture with other flame retardants.

In a further alternative preferred embodiment, elastomer modifiers E) can also be used in addition to components A) and B) and/or C) and/or D).

The component E) to be used optionally as elastomer modifier comprises at least one further polymer selected from the group of the vinyl (co)polymers and/or rubber-modified vinyl (co)polymers.

The polymers to be used optionally as component E) are preferably rubber-modified vinyl (co)polymers, i.e. graft polymers of at least one vinyl monomer on at least one rubber with glass transition temperature <10° C. as graft base. Component E) is particularly preferably graft polymers of from 1 to 60 parts by weight, preferably from 5 to 40 parts by weight, in particular from 9 to 25 parts by weight, of a mixture composed of from 50 to 99% by weight, in particular from 50 to 90% by weight, even more preferably from 55 to 85% by weight, very particularly preferably from 60 to 80% by weight, of vinylaromatics and/or ring-substituted vinylaromatics (e.g. styrene, α-methylstyrene, p-methylstyrene, p-chloro-styrene) and/or ($C_1$-$C_8$)-alkyl methacrylate (such as methyl methacrylate, ethyl methacrylate) and from 1 to 50% by weight, in particular from 10 to 50% by weight, even more preferably from 15 to 45% by weight, very particularly preferably from 20 to 40% by weight, of vinyl cyanides (unsaturated nitriles, such as acrylonitrile and methacrylonitrile) and/or ($C_1$-$C_8$)-alkyl (meth)acrylates (such as methyl methacrylate, n-butyl acrylate, tert-butyl acrylate) and/or derivatives (such as anhydrides and imides) of unsaturated carboxylic acids (e.g. maleic anhydride and N-phenyl-maleimide) on from 95 to 5% by weight, preferably from 90 to 10% by weight, in particular from 80 to 30% by weight, of one or more rubbers, optionally chemically or physically bonded to one another, with glass transition temperatures <10° C., preferably <0° C., particularly preferably <-20° C., as graft base.

The median particle size ($d_{50}$ value) of the graft base is generally from 0.05 to 10 μm, preferably from 0.1 to 5 μm, particularly preferably from 0.2 to 1 μm.

The median particle size $d_{50}$ is the diameter above and below which 50% by weight of the particles respectively lie. It can be determined via ultracentrifuge measurement (W. Scholtan, H. Lange, Kolloid, Z. und Z. Polymere 250 (1972), 782-1796).

Preferred vinylaromatics and/or ring-substituted vinylaromatics are styrene and α-methylstyrene, preferred vinyl cyanides and/or derivatives of unsaturated carboxylic acids and/or alkyl (meth)acrylates are acrylonitrile, maleic anhydride and methyl methacrylate.

Particularly preferred monomers are styrene and acrylonitrile.

Examples of graft bases suitable for the graft polymers are diene rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers and also composite rubbers, composed of two or more of the abovementioned systems.

Preferred graft bases are diene rubbers (e.g. based on butadiene, isoprene etc.) or a mixture of diene rubbers or copolymers of diene rubbers or their mixtures with further copolymerizable monomers, e.g. butadiene/styrene copolymers, with the proviso that the glass transition temperature on the graft base is <10° C., preferably <0° C., particularly preferably <-10° C.

Straight polybutadiene rubber is particularly preferred.

Examples of particularly preferred graft polymers of component E) are ABS polymers (emulsion, bulk and suspension ABS), as described by way of example in DE-A 2 035 390 (=U.S. Pat. No. 3,644,574) or in DE-A 2 248 242 (=GB Patent Specification 1 409 275) or in Ullmanns Enzyklopädie der Technischen Chemie [Ullmann's Encyclopaedia of Industrial Chemistry], Vol. 19 (1980), p. 280 et seq. The gel content of the graft base is preferably at least 30% by weight, in particular at least 40% by weight.

The gel content of the graft base is determined in toluene at 25° C. (M. Hoffmann, H. Krömer, R. Kuhn, Polymeranalytik I und H [Polymer analysis I and II], Georg Thieme-Verlag, Stuttgart 1977).

The graft copolymers of component E) can be prepared via free-radical polymerization, e.g. via emulsion polymerization, suspension polymerization, solution polymerization or bulk polymerization. They are preferably prepared by emulsion polymerization or bulk polymerization.

Other particularly suitable graft rubbers are ABS polymers prepared according to U.S. Pat. No. 4,937,285 by redox initiation using an initiator system composed of organic hydroperoxide and ascorbic acid.

According to the invention, the term graft polymer includes products which are obtained by (co)polymerization of the graft monomers in the presence of the graft base and arise concomitantly during work-up, since it is known that the graft monomers are not entirely grafted onto the graft base during the graft reaction.

Acrylate rubbers suitable as graft base are preferably polymers composed of alkyl acrylates, optionally also copolymers with up to 40% by weight, based on the graft base, of other polymerizable, ethylenically unsaturated monomers. Among the preferred polymerizable acrylic esters are $C_1$-$C_8$-alkyl esters such as methyl, ethyl, butyl, n-octyl and 2-ethylhexyl esters; haloalky esters, preferably halo-$C_1$-$C_8$-alkyl esters, such as chloroethyl acrylate, and mixtures of these monomers.

For crosslinking purposes it is possible to copolymerize monomers having more than one polymerizable double bond. Preferred examples of crosslinking monomers are esters of unsaturated monocarboxylic acids having from 3 to 8 carbon atoms and of unsaturated monohydric alcohols having from 3 to 12 carbon atoms, or saturated polyols having from 2 to 4 OH groups and from 2 to 20 carbon atoms, e.g. ethylene glycol dimethacrylate, allyl methacrylate; polyunsaturated heterocyclic compounds, such as trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which have at least three ethylenically unsaturated groups.

Particularly preferred crosslinking monomers are the cyclic monomers triallyl cyanurate, triallyl isocyanurate, triacryloylhexahydro-s-triazine, triallylbenzenes. The amount of the crosslinking monomers is preferably from 0.02 to 5% by weight, in particular from 0.05 to 2% by weight, based on the graft base.

In the case of cyclic crosslinking monomers having at least three ethylenically unsaturated groups, it is advantageous to restrict the amount to less than 1% by weight of the graft base.

Examples of preferred "other" polymerizable, ethylenically unsaturated monomers which can optionally serve alongside the acrylic esters for preparation of the graft base are acrylonitrile, styrene, α-methylstyrene, acrylamides, vinyl-$C_1$-$C_6$-alkyl ethers, methyl methacrylate, butadiene. Acrylate rubbers preferred as graft base are emulsion polymers whose gel content is at least 60% by weight.

Further suitable graft bases are the silicone rubbers described in DE-A 3 704 657 (=U.S. Pat. No. 4,859,740), DE-A 3 704 655 (=U.S. Pat. No. 4,861,831), DE-A 3 631 540 (=U.S. Pat. No. 4,806,593) and DE-A 3 631 539 (=U.S. Pat. No. 4,812,515), which have grafting sites.

Preferred vinyl (co)polymers are polymers of at least one monomer from the group of the vinylaromatics, vinyl cyanides (unsaturated nitriles), ($C_1$-$C_8$)-alkyl (meth)acrylates, unsaturated carboxylic acids, and derivatives (such as anhydrides and imides) of unsaturated carboxylic acids, in particular those of from 1 to 45 parts by weight, preferably from 5 to 37 parts by weight, in particular from 9 to 30 parts by weight, of a mixture composed of from 50 to 99% by weight, preferably from 60 to 80% by weight, of vinylaromatics and/or ring-substituted vinylaromatics, e.g. styrene, α-methylstyrene, p-methylstyrene, p-chlorostyrene, and/or ($C_1$-$C_8$)-alkyl methacrylates, such as methyl methacrylate, ethyl methacrylate, and from 1 to 50% by weight, preferably from 20 to 40% by weight, of vinyl cyanides (unsaturated nitriles), such as acrylonitrile and methacrylonitrile, and/or ($C_1$-$C_8$)-alkyl (meth)acrylates (such as methyl methacrylate, n-butyl acrylate, t-butyl acrylate) and/or unsaturated carboxylic acids (such as maleic acid) and/or derivatives (such as anhydrides and imides) of unsaturated carboxylic acids (e.g. maleic anhydride and N-phenylmaleimide).

The (co)polymers are resin-like and thermoplastic.

The copolymer is particularly preferably composed of styrene and acrylonitrile, another alternative being polymethyl methacrylate.

The (co)polymers are known and can be prepared by free-radical polymerization, in particular by emulsion, suspension, solution or bulk polymerization. The (co)polymers preferably have average molecular weights $M_w$ (weight average, determined by light scattering or sedimentation) of from 15 000 to 200 000.

In a further alternative preferred embodiment, antidripping agents F) can also be used in addition to components A) and B), and/or C) and/or D) and/or E).

The flame retardants corresponding to component D) are often used in combination with what are known as antidripping agents which reduce the tendency of the material to form burning drops in the event of fire. By way of example, mention may be made here of compounds of the following classes of substance: fluorinated polyolefins, silicones and aramid fibres. These can also be used in the inventive compositions. Fluorinated polyolefins are preferably used as antidripping agents.

Fluorinated polyolefins are known and are described by way of example in EP-A 0 640 655 (=U.S. Pat. No. 5,672, 645). They are marketed with the trademark Teflon® 30N by DuPont, for example.

The fluorinated polyolefins can be used either in pure form or else in the form of a coagulated mixture of emulsions of the fluorinated polyolefins with emulsions of the graft polymers or with an emulsion of a copolymer, preferably based on styrene/acrylonitrile or on PMMA, where the fluorinated polyolefin is mixed in the form of an emulsion with an emulsion of the graft polymer or of the copolymer and is then coagulated.

The fluorinated polyolefins can moreover be used in the form of precompounded material with the graft polymer or with a copolymer, preferably based on styrene/acrylonitrile or on PMMA. The fluorinated polyolefins in the form of powders are mixed with a powder or pellets of the graft polymer or copolymer, and compounded in the melt generally at temperatures of from 200 to 330° C. in conventional assemblies, such as internal mixers, extruders or twin-screw systems.

The fluorinated polyolefins can also be used in the form of a masterbatch prepared by emulsion polymerization of at least one monoethylenically unsaturated monomer in the presence of an aqueous dispersion of the fluorinated polyolefin. Preferred monomer components are styrene, acrylonitrile, methyl methacrylate and mixtures of these. Acidic precipitation and subsequent drying gives the polymer, which is used in the form of free-flowing powder.

The coagulates, precompounded materials or masterbatches usually have solids contents based on fluorinated polyolefin of from 5 to 95% by weight, preferably from 7 to 80% by weight.

The amounts used of the fluorinated polyolefins are from 0.05 to 5 parts by weight, preferably from 0.1 to 2.0 parts by weight, in particular from 0.2 to 0.9 parts by weight, and if a coagulate, precompounded material or masterbatch is used these quantitative data are based on the pure fluorinated polyolefin.

In a further alternative preferred embodiment, the following can be present in addition to components A) and B), and/or C) and/or D) and/or E) and/or F):

G) from 0.001 to 25 parts by weight, preferably from 0.05 to 15 parts by weight, particularly preferably from 0.1 to 5.0 parts by weight, of further conventional additives in the thermoplastic moulding compositions.

Examples of conventional additives of component G) are stabilizers (e.g. UV stabilizers, heat stabilizers, gamma-radiation stabilizers), antistatic agents, flow aids, mould-release agents, further fire-protection additives, emulsifiers, nucleating agents, plasticizers, lubricants, dyes, pigments and additives to increase electrical conductivity. The additives mentioned and further suitable additives are described by way of example in Gächter, Müller, Kunststoff-Additive [Plastics additives], 3rd Edition, Hanser-Verlag, Munich, Vienna, 1989 and in Plastics Additives Handbook, 5th Edition, Hanser-Verlag, Munich, 2001. The additives can be used alone or in a mixture, or in the form of masterbatches.

Examples of stabilizers that can be used are organophosphorus compounds, phosphites, sterically hindered phenols, hydroquinones, aromatic secondary amines, e.g. diphenylamines, substituted resorcinols, salicylates, benzotriazoles and benzophenones, and various substituted representatives of these groups, and their mixtures.

Examples of pigments that can be used are titanium dioxide, zinc sulphide, ultramarine blue, iron oxide, carbon black, phthalocyanines, quinacridones, perylenes, nigrosin, and anthraquinones.

Examples of nucleating agents that can be used are sodium phenylphosphinate or calcium phenylphosphinate, aluminium oxide, silicon dioxide and preferably talc.

Examples of lubricants and mould-release agents that can be used are ester waxes, pentaerythritol tetrastearate (PETS), long-chain fatty acids (e.g. stearic acid or behenic acid), their salts (e.g. Ca stearate or Zn stearate) and amide derivatives (e.g. ethylenebisstearylamide) or montan waxes (mixtures composed of straight-chain, saturated carboxylic acids having chain lengths of from 28 to 32 carbon atoms). Examples of plasticizers that can be used are dioctyl phthalate, dibenzyl phthalate, butyl benzyl phthalate, hydrocarbon oils, N-(n-butyl)benzenesulphonamide.

Polyolefins, preferably polyethylene and/or polypropylene, can likewise be used as component G). Low-molecular-weight polyethylene waxes and low-molecular-weight polypropylene waxes are particularly preferred.

Additives that can be added to increase electrical conductivity are conductive and other carbon blacks, carbon fibrils, nano-scale graphite fibres and nano-scale carbon fibres, graphite, conductive polymers, metal fibres and other conventional additives for increasing electrical conductivity. Nano-scale fibres that can be used are preferably those known as "single wall carbon nanotubes" or "multi-wall carbon nanotubes" (e.g. from Hyperion Catalysis).

According to the invention, the following combinations of the components are preferred
AB; A,B,C; A,B,D; A,B,E; A,B,F; A,B,G; A,B,C,D; A,B,C,E; A,B,C,F; A,B,C,G; A,B,D,E; A,B,D,F; A,B,D,G; A,B,E,F; A,B,E,G; A,B,F,G; A,B,C,D,E; A,B,C,D,G; A,B,C,F,G; A,B,E,F,G; A,B,D,F,G; A,B,C,D,E,F; A,B,C,D,E,G; A,B,D,E,F,G; A,B,C,E,F,G; A,B,C,D,E,G; A,B,C,D,E,F,G.

However, the present invention also provides a process for preparation of the inventive thermoplastic moulding compositions. This takes place by known methods by mixing of the components. The mixing of the components takes place by mixing the components in the corresponding proportions by weight. The mixing of the components preferably takes place at temperatures of from 220 to 330° C. by combining, mixing, kneading, extruding or rolling the components together. It can be advantageous to premix individual components. It can moreover be advantageous to produce mouldings or semifinished products directly from a physical mixture (dry blend), prepared at room temperature (preferably from 0 to 40° C.), of premixed components and/or of individual components.

The invention further provides the mouldings to be produced from the inventive moulding compositions comprising
A) from 99.9 to 10 parts by weight, preferably from 99.0 to 40 parts by weight, particularly preferably from 80.0 to 50.0 parts by weight, of at least one thermoplastic polycarbonate, preferably of an aromatic polycarbonate and/or of a polyester carbonate, and
B) from 0.1 to 20 parts by weight, preferably from 0.25 to 15 parts by weight, particularly preferably from 1.0 to 10 parts by weight, of at least one copolymer of at least one olefin, preferably an α-olefin, and at least one methacrylic ester or acrylic ester of an aliphatic alcohol, preferably an aliphatic alcohol having from 5-30 carbon atoms, where the MFI (Melt Flow Index) of the copolymer B), measured at 190° C. with 2.16 kg, is no less than 100 g/10 min, preferably no less than 150 g/10 min.

Alongside this it is also, however, possible to use, for B), copolymers of at least one olefin, preferably an α-olefin, with at least one methacrylic or acrylic ester of an aliphatic $C_1$-$C_4$ alcohol, to obtain appropriate mouldings.

The inventive mouldings produced from the compositions which are based on thermoplastic polycarbonates and have been used according to the invention feature higher notched impact strength than mouldings produced from moulding compositions of comparable viscosity which have been prepared by using a lower-viscosity main resin as component A), and indeed than mouldings produced from moulding compositions prepared by using a high-viscosity main resin as component A). Other key mechanical properties are obtainable at the level of the unmodified material without significant losses, and replacement of material is therefore possible.

The inventive moulding compositions exhibit markedly improved flowability, in particular at the shear rates relevant for thermoplastics processing. This is also discernible inter alia in the markedly reduced injection pressures.

The inventive moulding compositions can be processed by conventional methods, for example by injection moulding or extrusion, to give mouldings or semifinished products. Examples of semifinished products are foils and sheets. Injection moulding is particularly preferred.

Examples of these mouldings are foils, profiles, housing parts of any type, e.g. for household devices such as juice presses, coffee machines, mixers; for office equipment such as monitors, printers, copiers; and moreover sheets, pipes, cable ducts, profiles for the construction sector, interior fitting-out and exterior applications; parts from the electrical engineering sector, such as switches and plugs, and interior and exterior parts for automobiles.

The inventive compositions can in particular be used by way of example for production of the following mouldings:

Parts for interior fitting-out of rail vehicles, ships, aircrafts, buses and automobiles, wheel caps, housings of electrical devices comprising small transformers, housings for devices for the broadcasting and transmission of information, housings and cladding for medical purposes, massage devices and housings for these, toy vehicles for children, sheet-like wall elements, housings for safety and security equipment, tailgate spoilers, bodywork parts for motor vehicles, thermally insulated transport containers, apparatus for the keeping or care of small animals, mouldings for sanitary and bath equipment, grilles for ventilator openings, mouldings for garden sheds and tool sheds, housings for garden devices, parts having safety and security functions in automobile interiors.

The inventive moulding compositions can particularly be used for applications which require high melt flowability. An example of such applications is provided by what are known as thin-wall technology applications, in which the wall thicknesses of mouldings to be produced from the moulding compositions are less than 2.5 mm, preferably less than 2.0 mm, particularly preferably less than 1.5 mm and most preferably less than 1.0 mm. A further example of such applications is cycle-time reduction, e.g. via lowering of processing temperature. A further example of an application is the processing of the moulding compositions by way of what are known as multitooling systems, in which material is charged by way of a runner system to at least 4 moulds, preferably at least 8 moulds, particularly preferably at least 12 moulds, most preferably at least 16 moulds, in an injection-moulding procedure.

EXAMPLES

Component A1: Linear polycarbonate based on bisphenol A with relative solution viscosity of 1.28, measured in $CH_2Cl_2$ as solvent at 25° C. at a concentration of 0.5 g/100 ml.

Component A2: Linear polycarbonate based on bisphenol A with relative solution viscosity of 1.24, measured in $CH_2Cl_2$ as solvent at 25° C. at a concentration of 0.5 g/100 ml.

Component B1: Copolymer of ethene and 2-ethylhexyl acrylate with ethene content of 63% by weight and MFI of 550 (Lotryl® 37 EH 550 from Atofina Deutschland, Düsseldorf (since October 2004 Arkema GmbH)) [CAS No. 26984-27-0]

Component B2: Copolymer of ethene and n-butyl acrylate with ethene content of from 70 to 74% by weight and MFI of 175 (Lotryl® 28 BA 175 from Atofina Deutschland, Düsseldorf (since October 2004 Arkema GmbH)) [CAS No. 25750-84-9]

Comparative component V: Copolymer of ethene, methyl acrylate and glycidyl acrylate with 26% by weight methyl acrylate content and 8% glycidyl acrylate content and MFI of 6 (Lotader® AX 8900 from Atofina Deutschland, Düsseldorf (since October 2004 Arkema GmbH))

Component E: Graft polymer of 40 parts by weight of styrene and acrylonitrile in a ratio by weight of 73:27 on 60 parts by weight of particulate crosslinked polybutadiene rubber (median particle diameter $d_{50}$=0.3 µm) prepared by emulsion polymerization and styrene/acrylonitrile copolymer with styrene/acrylonitrile ratio by weight of 72:28 and intrinsic viscosity of 0.55 dl/g (measured in dimethylformamide at 20° C.), where the ratio of graft polymer to styrene/acrylonitrile copolymer is 3:4, based on contents by weight.

Component G: The following components whose use is familiar in thermoplastic polycarbonates were used as further additives:

Heat stabilizer: amounts of from 0.01 to 0.8% by weight of conventional stabilizers based on phenyl phosphites.

Mould-release agents: amounts of from 0.1 to 0.86% by weight of commercially available fatty acid esters.

The nature and amount of each of the further additives (component G) used are the same for corresponding comparative examples and inventive examples.

The compositions based on polycarbonate in the inventive examples and comparative examples in Table 1 were compounded in a ZSK32 (Werner and Pfleiderer) twin-screw extruder at melt temperatures of from 260 to 300° C. to give moulding compositions, the melts being discharged into a water bath and then pelletized.

The test specimens for the studies listed in Table 1 were injection moulded in an Arburg 320-210-500 injection moulding machine at melt temperature of about 280° C. and mould temperature of about 80° C.:
dumbbell specimens (thickness 3 mm to ISO 527)
80×10×4 mm test specimens (to ISO 178).

The injection pressure is the internal mould pressure applied in order to fill the mould cavity and is measured in the vicinity of the gate. In the curve of pressure as a function of time it is a characteristic inflection point between the mould-filling and compaction phase, and can be determined by way of process data capture. It was determined for comparative examples and inventive examples during the injection moulding of flat specimens (80×10×4 mm³) and dumbbell specimens (3 mm) on two different injection moulding machines (I and II).

With the exception of the melt viscosity measurements and the melt index measurements, all of the tests were carried out on the abovementioned test specimens.

Tensile test to DIN/EN/ISO 527-2/1 A.

Notched impact strength: IZOD method to ISO 180 1A at room temperature

Vicat softening point: determined to DIN ISO 306 by Method B (50 N load) and with heating rates of 120 K/h.

Melt viscosity: determined to DIN 54811/ISO 11443 at the stated shear rate and temperature with Viscorobo 94.00 equipment from Göttfert after drying of the pellets at 120° C. for 4 hours in a vacuum dryer.

Melt index MVR (Melt Volume Flow Rate): determined to DIN EN ISO 1133 with the stated force and temperature after drying of the pellets at 120° C. for 4 hours in a vacuum dryer.

TABLE 1

| | | Comp. Ex. 1 | Comp. Ex. 2 | Comp. Ex. 3 | Inv. Ex. 1 | Inv. Ex. 2 | Inv. Ex. 3 | Inv. Ex. 4 | Inv. Ex. 5 | Inv. Ex. 6 | Comp. Ex. 4 |
|---|---|---|---|---|---|---|---|---|---|---|---|
| Component A1 | [%] | 28.13 | 57.13 | — | 25.63 | 52.13 | — | 25.63 | 52.13 | — | 25.63 |
| Component A2 | [%] | 29.0 | — | 57.13 | 26.5 | — | 52.13 | 26.5 | — | 52.13 | 26.5 |
| Component E | [%] | 42.0 | 42.0 | 42.0 | 42.0 | 42.0 | 42.0 | 42.0 | 42.0 | 42.0 | 42.0 |
| Component G | [%] | 0.87 | 0.87 | 0.87 | 0.87 | 0.87 | 0.87 | 0.87 | 0.87 | 0.87 | 0.87 |
| Component B1 | [%] | — | — | — | 5.0 | 5.0 | 5.0 | — | — | — | — |
| Component B2 | [%] | — | — | — | — | — | — | 5.0 | 5.0 | 5.0 | — |
| Comparative component V | [%] | — | — | — | — | — | — | — | — | — | 5.0 |
| MVR at 260° C./5 kg | [cm³/10 min] | 11 | 9 | 13 | 17 | 13 | 16 | 18 | 14 | 17 | 4 |
| Melt viscosity at 260° C.: | | | | | | | | | | | |
| Eta 50 | [Pas] | 870 | 1020 | 870 | 540 | 610 | 529 | 630 | 660 | 580 | 1400 |
| Eta 500 | [Pas] | 320 | 350 | 330 | 220 | 240 | 212 | 260 | 270 | 230 | 430 |
| Eta 1000 | [Pas] | 230 | 240 | 210 | 180 | 170 | 160 | 180 | 180 | 170 | 270 |
| Eta 1500 | [Pas] | 160 | 170 | 170 | 130 | 130 | 120 | 140 | 140 | 130 | 210 |
| Melt viscosity at 280° C.: | | | | | | | | | | | |
| Eta 50 | [Pas] | 570 | 610 | 520 | 420 | 440 | 450 | 430 | 520 | 290 | 850 |
| Eta 500 | [Pas] | 240 | 240 | 220 | 140 | 160 | 150 | 170 | 210 | 150 | 300 |
| Eta 1000 | [Pas] | 170 | 180 | 150 | 130 | 120 | 100 | 120 | 150 | 110 | 200 |
| Eta 1500 | [Pas] | 130 | 130 | 120 | 90 | 100 | 90 | 100 | 120 | 90 | 160 |
| Tensile test (50 mm/min): | | | | | | | | | | | |
| Yield stress (YS) | [N/mm²] | 52 | 52 | 52 | 46 | 46 | 46 | 47 | 47 | 46 | 38 |
| Yield tension (E) | [%] | 4.1 | 4.2 | 4.0 | 4.2 | 4.2 | 4.3 | 4.7 | 4.7 | 4.6 | 6.5 |
| Tensile modulus | [N/mm²] | 2100 | 2150 | 2150 | 1900 | 1950 | 1900 | 1900 | 1900 | 1850 | 1650 |
| Izod notched impact strength (ISO 180/1A), RT | [kJ/m²] | 47 | 48 | 43 | 68 | 86 | 57 | 93 | 95 | 73 | 43 |
| Vicat B (120 K/h) | [° C.] | 122 | 123 | 118 | 116 | 116 | 116 | n.m. | n.m. | n.m. | 118 |
| Injection pressure, injection | | | | | | | | | | | |

TABLE 1-continued

|  | | Comp. Ex. 1 | Comp. Ex. 2 | Comp. Ex. 3 | Inv. Ex. 1 | Inv. Ex. 2 | Inv. Ex. 3 | Inv. Ex. 4 | Inv. Ex. 5 | Inv. Ex. 6 | Comp. Ex. 4 |
|---|---|---|---|---|---|---|---|---|---|---|---|
| moulding machine I | | | | | | | | | | | |
| Flat specimen | [bar] | 225 | 235 | 210 | 180 | 190 | 175 | nm. | n.m. | n.m. | 275 |
| Dumbbell specimen | [bar] | 355 | 375 | 340 | 300 | 315 | 295 | n.m. | n.m. | n.m. | 435 |
| Injection pressure, injection moulding machine II | | | | | | | | | | | |
| Flat specimen | [bar] | 185 | 188 | 168 | 156 | 160 | 145 | 157 | 161 | 145 | n.m. |
| Dumbbell specimen | [bar] | 299 | 311 | 275 | 258 | 263 | 239 | 258 | 259 | 241 | n.m. | n.m. = not measured

The invention claimed is:

1. A thermoplastic moulding composition, consisting of:
A) from 99.9 to 10 parts by weight of at least one thermoplastic polycarbonate and
B) from 0.1 to 20 parts by weight of at least one copolymer formed of the copolymerization of at least one olefin and at least one methacrylic ester or acrylic ester of an aliphatic alcohol, wherein the MFI of the copolymer is no less than 100 g/10 min,
wherein said parts by weight is based on the weight of the thermoplastic moulding composition, wherein the at least one methacrylic ester or acrylic ester of an aliphatic alcohol is selected from the group consisting of 2-ethylhexyl acrylate and n-butyl acrylate, and the olefin is ethane.

2. The thermoplastic moulding composition according to claim 1, wherein the copolymer is composed of less than 4% by weight of monomer units which contain reactive functional groups selected from the group consisting of epoxides, oxetanes, anhydrides, imides, aziridines, furans, acids, amines, and oxazolines.

3. The thermoplastic moulding compositions according to claim 1, wherein the MFI of is not less than 150 g/10 min.

4. A process for producing a moldinq or semifinished product, comprising:
providing the thermoplastic moulding composition according to claim 1, and
injection moulding or extruding the composition, thereby forming said molding or semifinished product.

* * * * *